United States Patent [19]
Everhart et al.

[11] Patent Number: 5,866,622
[45] Date of Patent: Feb. 2, 1999

[54] RECOVERY OF POLYESTER FROM CONTAMINATED POLYESTER WASTE

[75] Inventors: William Duke Everhart, Wilmington, N.C.; Kamel Michel Makar, Wilmington, Del.; Roger George Rudolph, Wilmington, N.C.

[73] Assignee: E. I. du Pont de Nemours and Company, Wilmington, Del.

[21] Appl. No.: 844,491

[22] Filed: Apr. 18, 1997

[51] Int. Cl.$^6$ .............................. C08J 11/04; C08G 63/16
[52] U.S. Cl. ........................ 521/48; 528/308.1; 528/491
[58] Field of Search ................. 521/48, 46.5; 528/308.1, 528/494

[56] References Cited

U.S. PATENT DOCUMENTS

| | | | |
|---|---|---|---|
| 3,039,983 | 6/1962 | Beindorff et al. | 260/31.2 |
| 5,342,854 | 8/1994 | Serad | 521/48 |
| 5,391,263 | 2/1995 | Hepner et al. | 203/51 |
| 5,554,657 | 9/1996 | Brownscombe et al. | 521/48 |

FOREIGN PATENT DOCUMENTS

| | | |
|---|---|---|
| 0 484 963 B1 | 7/1995 | European Pat. Off. |
| 1 518 211 | 7/1978 | France. |
| 1 548 043 | 7/1979 | France. |

*Primary Examiner*—James J. Seidleck
*Assistant Examiner*—Olga Asinousky

[57] ABSTRACT

A process for recovering a polyester, preferably polyethylene terephthalate, from contaminated polyester waste containing non-polyester components, such as polyester blended with cotton or other fibers in fabric or fiber forms, polyester magnetic tapes, coated polyester films and engineering resins, by dissolving the polyester in molten dimethylterephthalate, methyl-p-toluate or dimethylisophthalate as solvent and separating the polyester solution from the non-polyester components. The polyester can subsequently be recovered by crystallization or the polyester solution can be used as a feedstock for methanolysis to form dimethylterephthalate (DMT) and alkylene glycol. The DMT can be subsequently hydrolyzed to recover terephthalic acid (TPA).

7 Claims, 1 Drawing Sheet

RECOVERY OF POLYESTER FROM CONTAMINATED POLYESTER WASTE

FIELD OF THE INVENTION

The present invention relates to a process for recovering a polyester, preferably polyethylene terephthalate (PET), from contaminated polyester waste, such as polyester blended with cotton or other fibers in fabric or fiber forms, polyester magnetic tapes, coated polyester films and engineering resins. The polyester can subsequently be used as a feedstock for methanolysis to form dimethylterephthalate (DMT) and alkylene glycol.

BACKGROUND OF THE INVENTION

Prior art methods are known for the recovery of polyester from cotton fabrics and from photographic film waste, which involve dissolution of the polyester in various solvents, followed by precipitating and recovering the polyester.

U.S. Pat. No. 5,342,854, issued on Aug. 30, 1994, describes a process for recovering polyester from a polyester/cotton blend fabric by dissolving the polyester in an alkyl sulfone solvent, separating the dissolved polyester and alkyl sulfone solvent solution from the cotton fabric and precipitating the polyester from the alkyl sulfone solvent solution.

British Patent 1,548,043, published on Jul. 4, 1979, describes a process for obtaining polyethylene terephthalate (PET) powder from PET textile waste by dissolving the PET in a halogenated hydrocarbon solvent at a temperature of up to 200° C. at the vapor pressure of the solvent and cooling the PET solvent solution to precipitate the PET powder.

British Patent 1,518,211, published on Jul. 19, 1978, describes a process for recovering silver value from photographic film waste, which waste comprises silver halide and/or metallic silver, a layer of polyester base film and a subbing layer of polyvinyl-idenechloride. The photographic waste is dissolved in an aromatic ether solvent, such as anisole, phenetole or benzyl ether, the silver value is separated by filtration and the solvent phase is subsequently cooled to precipitate the PET while maintaining the polyvinyl-idenechloride in solution.

Technical, economic and environmental considerations due to the solvent systems used in the prior art processes dramatically limit their applicability to laboratory scale investigations. Such solvent systems have very limited commercial applications.

The process of the present invention provides an effective, reliable and economical means for recovering a polyester, particularly polyethylene terephthalate (PET), from contaminated polyester waste such as a polyester and cotton blend fabric, a polyester magnetic tape, or other contaminated polyester waste. Advantageously, the polyester can be recovered by crystallization, filtration and solid state processed to an appropriate molecular weight. Alternatively, the dissolved polyester can be utilized directly as a feedstock for methanolysis to recover dimethyltere-phthalate (DMT) and alkylene glycol. The DMT can subsequently be hydrolyzed to recover terephthalic acid (TPA).

SUMMARY OF THE INVENTION

The present invention provides a process for recovering polyester from contaminated polyester waste consisting of polyester and non-polyester components, comprising the steps of:

(a) contacting the contaminated polyester waste with a solvent selected from the group consisting of molten dimethylterephthalate (DMT), methyl-p-toluate (MPT) and dimethylisophthalate (DMI);

(b) heating the contaminated polyester waste and solvent at a temperature of from 160° to 250° C. to dissolve and form a solution of the polyester in the solvent;

(c) filtering the undissolved non-polyester components from the dissolved polyester solution at a temperature of from 160° to 250° C.; and (d) recovering the dissolved polyester from the solution.

In a preferred embodiment of the invention, the dissolved polyester is step (d) is depolymerized with methanol vapor to form dimethylterephthalate and an alkylene glycol.

DETAILED DESCRIPTION OF THE INVENTION

Figure 1:
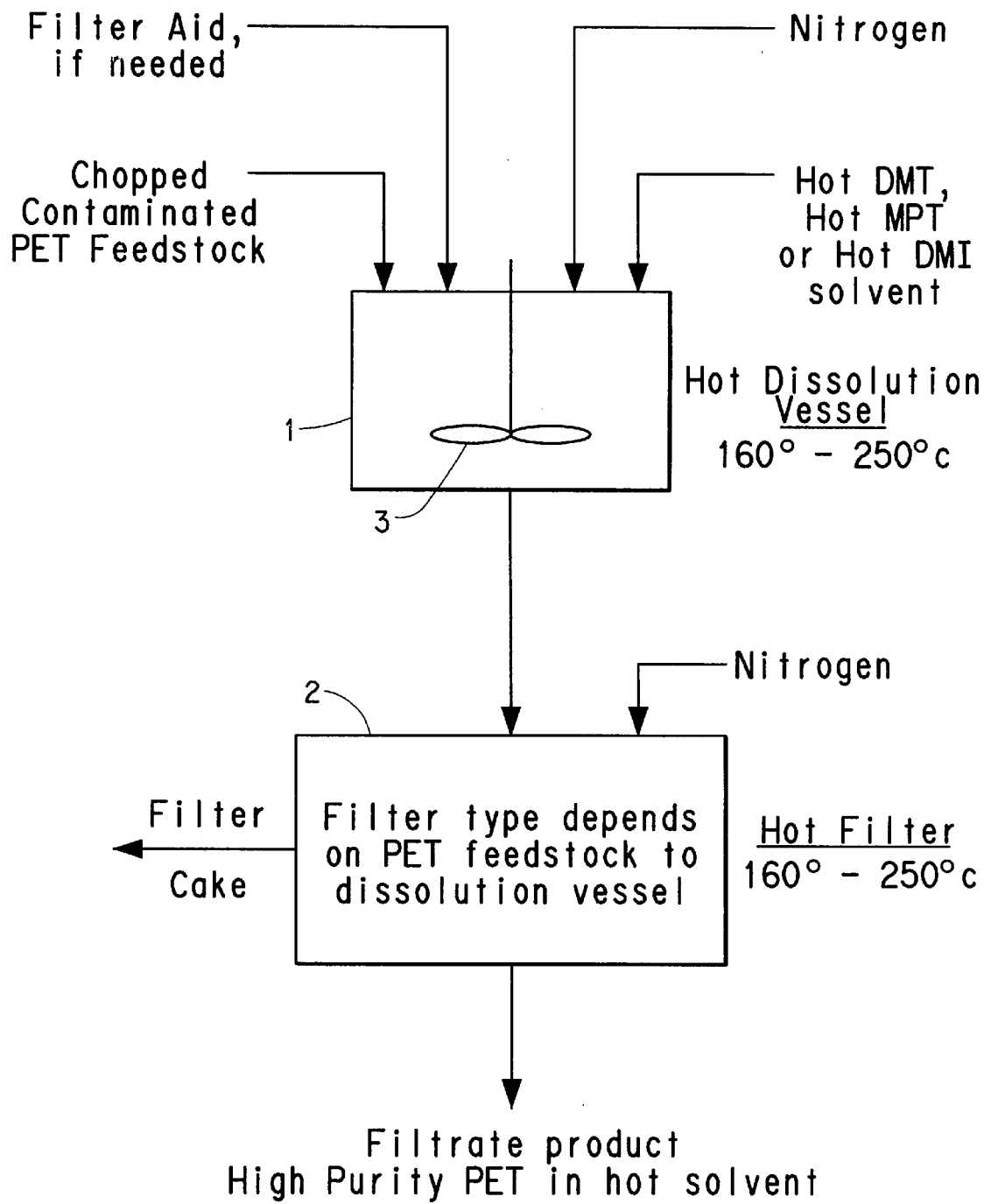
FIG. 1 is a schematic diagram of the system for PET recovery from contaminated PET waste feedstock according to the present invention.

The contaminated polyester waste used in the present invention consists of polyester and non-polyester components such as polyester blended with cotton or other fibers in fabric or fiber form, polyester magnetic media, coated polyester films and engineering resins. The amount of non-polyester component that can be included in the polyester waste can range from 10 to 90% by weight, preferably from 10 to 50% by weight.

Polyester and cotton blends may be obtained from various sources including cut and sew waste from manufacturers, spinning waste from manufacturers and post consumer garments. Sources of waste polyester magnetic media may be obtained from audio, video or computer tapes.

Referring to FIG. 1, the waste polyester material, cut and chopped into small pieces for ease of handling, is fed to reaction vessel 1 equipped with stirrer 3. Approximately one centimeter squares of polyester and cotton fabric or magnetic tape have been found to be readily transferable to vessel 1.

The polyester waste material is contacted with molten dimethylterephthalate (DMT), methyl-p-toluate (MPT) or dimethylisophthalate (DMI) (which serve as a solvent) in vessel 1. Preferably, the concentration of the solvent solution is based upon a 5 to 75 weight %, preferably 20 to 50 weight %, solids content.

The polyester as described herein can be polyethylene terephthalate (PET), polybutylene terephthalate (PBT) or polypropylene terephthalate (PPT). PET is particularly preferred.

After addition of the solvent to reaction vessel 1, the temperature is increased to from 160° to 250° C., preferably from 180° to 200° C., and maintained for a period of from 60 to 120 minutes to completely dissolve the polyester in the solvent.

In some cases, a filtering aid such as Perlite® 1200 purchased from the Eagle-Pitcher Co. or other suitable filter aid is added to act as the filter element in the hot filtration. It is also preferable to apply a blanket of nitrogen over reaction vessel 1 to prevent degradation of the polyester during the process.

The mixture is then fed to heated filter 2 to remove the non-polyester components, such as cotton fibers or metal oxide/binder materials, from the dissolved polyester. The filter cake can be washed to remove any residual solvent or contaminants and dried. Filtration may be either by gravity or by a vacuum type filter or pressure filter. Typical filter media include glass frits for laboratory purposes and stainless steel packing for commercial purposes.

For commercial application, a hot filtration at from 160° to 250° C., preferably from 180° to 200° C., is required to avoid freezing problems and to recover high purity polyester in the solvent. Typically, the polyester contains less than 1% by weight of non-polyester components.

For the case of polyester and cotton blends, the cotton recovered after filtration is suitable for use as a feedstock for charcoal, a seepage control additive in oil well drilling fluids and as a filler in various industrial compositions such as mastic compounds, automobile undercoatings, and the like.

The filtrate product consists of a high purity polyester polymer dissolved in hot solvent. The polyester which is suitable for most fiber uses can be recovered by cooling and crystallization. Solid state polymerization may be used to obtain polyester of higher molecular weight. Molecular weight is increased by heating in the solid state.

In a preferred embodiment, the dissolved polyester polymer is used as a feedstock for methanolysis to recover dimethylterephthalate and alkylene glycol, substantially as disclosed in European Patent 0 484 963 and U.S. Pat. No. 5,391,263, which disclosures are incorporated herein by reference. The DMT can be subsequently hydrolyzed to recover terephthalic acid (TPA).

Advantageously, it is not necessary to isolate the polyester before feeding the solution to the methanolysis process since the solvent used is an integral part of the methanolysis process. Moreover, feeding a clean polyester stream to the methanolysis process: (1) avoids the high purge rate of non-PET material which carries with it hot DMT (solvent) containing dissolved polyester thereby minimizing yield loss, (2) increases equipment life by removing extraneous metal particles that can accumulate in valves and pumps, and (3) makes use of lower value feedstocks with high non-polyester components which are not economical as direct feed to methanolysis due to the high purge rate mentioned above.

EXAMPLE 1

This example illustrates the recovery of PET from magnetic tape.

To a 40-gallon heated stirred vessel, were added 7,500 grams of chopped PET based magnetic tape, 750 grams of filter aid (Perlite® 1200) and 60,000 grams of molten methyl p-toluate (MPT). The reactor was heated to 200° C. with stirring and held at this temperature until the PET dissolved (2 hours). The pressure was approximately 30 psig.

The contents of the reactor were filtered by hot filtration. The filter cake, consisting of magnetic oxides and binders from the magnetic tape and the filter aid, was purged with nitrogen to recover additional product.

The recovery of PET, corrected for liquid hold-up in the hot batch filter, was about 90%.

The recovered PET filtrate contained less than 100 ppm metals contamination. The recovered PET had a terephthalic acid (TPA) to glycol ratio of 60% TPA to 40% glycol, which is typical for PET.

EXAMPLE 2

This example illustrates the recovery of PET from a 65/35 PET/cotton fabric.

Five grams of PET/cotton fabric (65% PET/35% cotton) were dissolved in 40 grams of molten methyl p-toluate (MPT) at 200° C. with stirring in a heated, open glass pyrex beaker. The slurry was filtered at a temperature of 200° C. and the cotton separated from the homogeneous MPT/PET solution. Dissolution of PET was quantitative (100%), and recovery of cotton was 100%. Recovery of the dissolved PET, from both the filtrate and by compressing the filter cake, was about 90%. The recovered PET was cotton free.

EXAMPLE 3

This example illustrates the recovery of PET from a 60/40 PET/cotton fabric.

Five grams of PET/cotton fabric (60% PET/40% cotton) were dissolved in 40 grams of molten dimethyl-terephthalate (DMT) at 200° C. with stirring in a heated open glass pyrex beaker. The slurry was filtered at a temperature of 200° C. and the cotton separated from the DMT/PET solution. The DMT/PET was a homogeneous solution. Dissolution of the PET was quantitative (100%), and recovery of cotton was 100%. Recovery of the dissolved PET, from both the filtrate and by compressing the filter cake, was greater than 90%. The recovered PET was cotton free.

EXAMPLE 4

This example illustrates the recovery of PET from a hot solution of PET in DMT and depolymerization of the PET to recover dimethylterephthalate (DMT) and ethyleneglycol.

A solution of 200 grams of PET, 200 grams of DMT (as solvent) was subject to methanolysis at 290° C. and 80 psig in the reactor unit described in European Patent 0 484 963. Methanol flow to the reactor was 200 cubic centimeters per hour and was carried out for 4 hours. Analysis of the reactor effluent showed, based on dissolved polyester, a 90% conversion to DMT, 89% conversion to ethylene glycol and an 8% conversion to the mixed glycol-methyl ester of terephthalic acid.

What is claimed is:

1. A process for recovering polyester from contaminated polyester waste consisting of polyester and non-polyester components selected from the group consisting of polyester blended with cotton and polyester magnetic media consisting essentially of the steps of:

(a) contacting the contaminated polyester waste with a solvent selected from the group consisting of molten dimethylterephthalate (DMT), methyl-p-toluate (MPT) and dimethylisophthalate (DMI);

(b) heating the contaminated polyester waste and solvent at a temperature from 160° to 250° C. to dissolve and form a solution of the polyester in the solvent;

(c) filtering the undissolved non-polyester components from the dissolved polyester solution at a temperature from 160° to 250° C.; and (d) recovering the dissolved polyester from the solution.

2. The process of claim 1 wherein the polyester is polyethylene terephthalate.

3. The process of claim 1 wherein the polyester and cotton blend comprises from 90 to 10 weight % of polyester and from 10 to 90% cotton fibers.

4. The process of claim 1 wherein the contaminated polyester waste and solvent are heated at a temperature of from 180° to 200° C. for from 60 to 120 minutes to completely dissolve the polyester in the solvent.

5. The process of claim 1 wherein the polyester is recovered from the solution by crystallization and subsequently processed by solid state polymerization to increase the molecular weight.

6. The process of claim 1 comprising contacting the contaminated polyester waste with a solvent in the presence of a filter aid.

7. The process of claim 1 wherein the polyester waste is polyester magnetic media.

* * * * *